Orville Beyea
INVENTOR.

BY Clarence A. O'Brien
and Harvey B. Jacobson
Attorneys

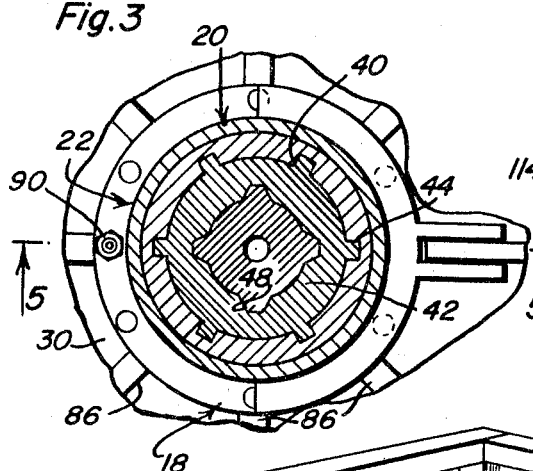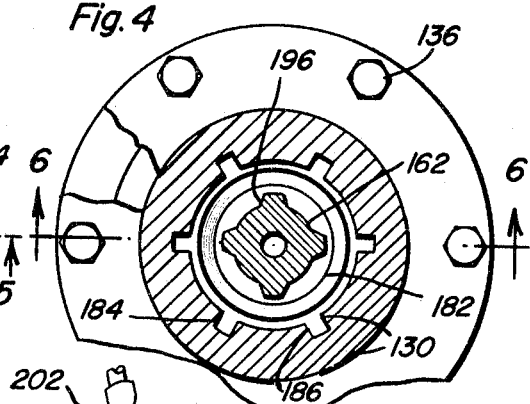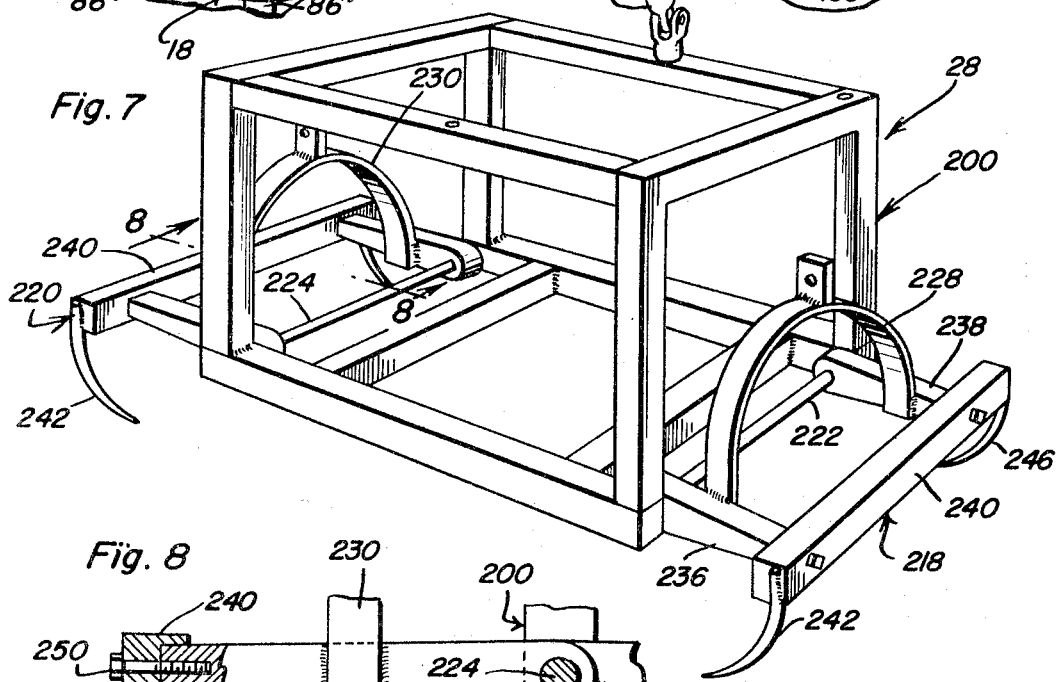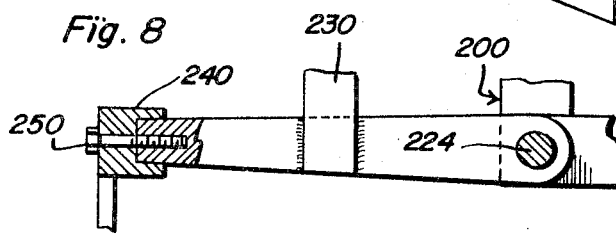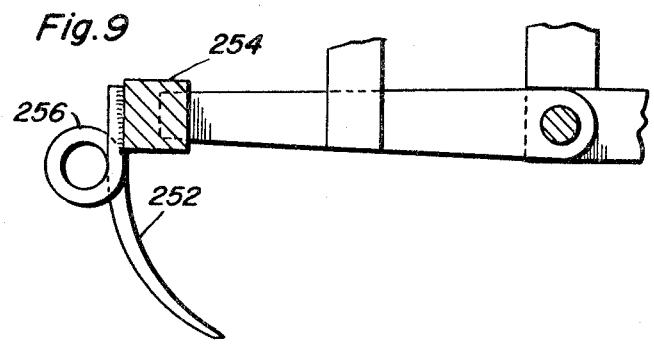
Orville Beyea
INVENTOR.

May 16, 1967      O. BEYEA      3,319,813
HAY LOADER
Filed July 15, 1965      4 Sheets-Sheet 4
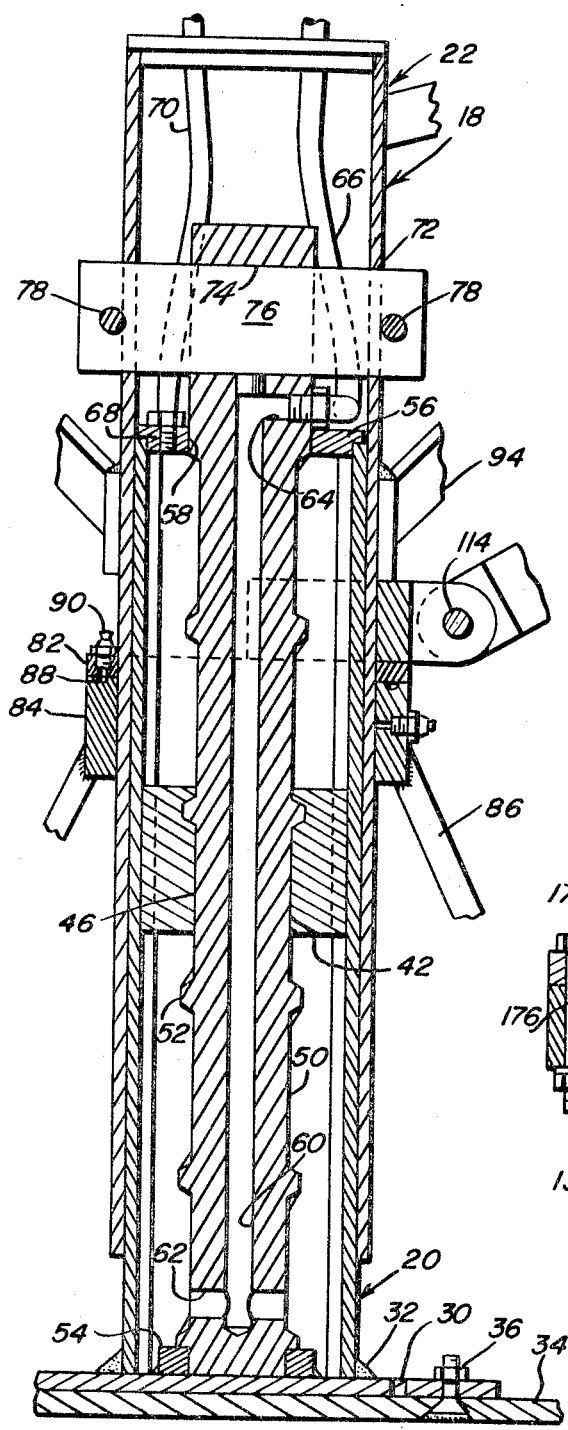
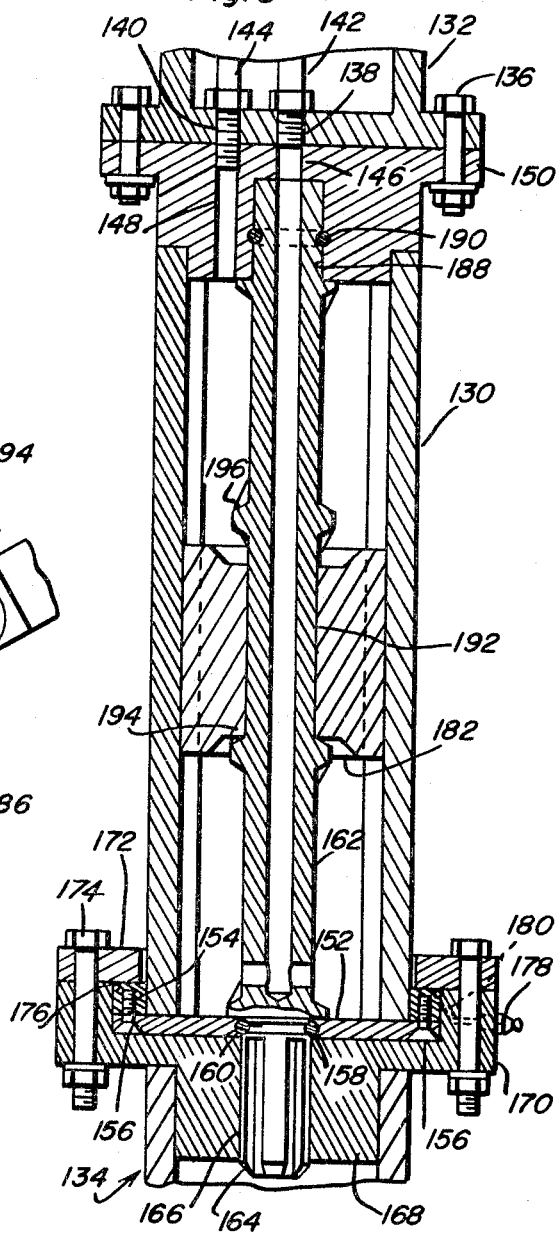
Orville Beyea
INVENTOR.
BY *Wayne A. O'Brien*
and *Harvey B. Jackson*
Attorneys

United States Patent Office 3,319,813
Patented May 16, 1967

3,319,813
HAY LOADER
Orville Beyea, Dickens, Nebr. 69132
Filed July 15, 1965, Ser. No. 472,215
17 Claims. (Cl. 214—133)

This invention relates to a novel and useful hay loader and more specifically to a crane-type assembly adapted to be supported from the load bed of a vehicle so as to be readily transported from one location to another.

The crane-like assembly of the instant invention includes an upright standard having upper and lower sections and the lower section is adapted to be fixedly secured to the load bed or platform while the upper section of the standard is supported from the lower section for rotation relative thereto and with means provided for effecting rotation of the upper section relative to the lower section. Further, a vertically swingable boom is hingedly secured at one end to the upper section of the standard and means is operatively connected between the boom and the upper section of the standard to adjustably swing the boom. Still further, a reach boom has one end pivotally secured to the first mentioned or lift boom and means is also provided for pivoting the reach boom relative to the lift boom. The free end of the reach boom has a clam shell-type hay bale grapple assembly universally supported therefrom with means provided for actuating the grapple arms and for adjustably inclining the grapple assembly relative to the face end of the lift boom about axes disposed normal to the longitudinal center line of the lift boom and at right angles to each other. Finally, the free end portion of the reach boom is rotatable relative to the end thereof which is pivotally secured to the free end of the lift boom and means is provided and establishes an operable connection between the two end portions of the reach boom for effecting rotation of the free end of the reach boom relative to the end thereof which is pivotally secured to the free end of the lift boom.

The upper end of the standard has an operator's platform supported therefrom and controls disposed adjacent the operator's platform for operating the hay loader. In addition, the operator's platform also includes a prime mover drivingly coupled to a hydraulic pump. The various means provided for rotating the various boom sections relative to each other and for pivoting the lift boom and the reach boom relative to the standard and the lift boom, respectively, together with the means for actuating the tines of the grapple assembly and for pivoting the latter about axis disposed at right angles relative to each other and normal to the longitudinal center line of the reach boom are hydraulically actuated. The control means for operating the hay loader comprise various valve assemblies by which the various hydraulically actuated means for operating the hay loader may be selectively communicated with the output of the hydraulic pump.

The main object of this invention is to provide a hay loader which will be capable of reaching for, engaging, and lifting a bale of hay from a pile of hay bales and then displacing the hay bale to another location before releasing it.

Another object of this invention is to provide a hay loader in accordance with the preceding objects and including a grappling assembly supported from the remainder of the hay loader in a manner such that the grappling assembly may be properly orientated relative to the hay loader for proper engagement with a bale of hay regardless of the orientation of the bale of hay to be lifted, it being a further object of this invention to provide a hay bale grappling assembly which will be capable of properly orientating the lifted bale of hay as desired before releasing the hay bale in its ultimate location.

Yet another object of this invention is to provide a hay loader in accordance with the preceding objects and including means whereby the operator of the hay loader may be properly orientated relative to the location from which bales are to be removed and also the location at which the hay bales handled by the hay loader are to be deposited.

A final object of this invention to be specifically enumerated herein is to provide a hay loader in accordance with the preceding objects which will conform to conventional forms of manufacture, be of simple construction and easy to operate so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged fragmentary horizontal sectional view taken substantially upon the plane indicated by the section line 3—3 of FIGURE 2;

FIGURE 4 is an enlarged fragmentary horizontal sectional view taken substantially upon the plane indicated by the section line 4—4 of FIGURE 2;

FIGURE 5 is a fragmentary vertical sectional view taken substantially upon the plane indicated by section line 5—5 of FIGURE 3;

FIGURE 6 is an enlarged fragmentary vertical sectional view taken substantially upon a plane indicated by section line 6—6 of FIGURE 4;

FIGURE 7 is a perspective view of the hay bale grappling assembly;

FIGURE 8 is a fragmentary enlarged vertical sectional view taken substantially upon a plane indicated by section line 8—8 of FIGURE 7;

FIGURE 9 is a fragmentary vertical sectional view similar to FIGURE 8 but illustrating a modified form of lifting tong for the grappling assembly; and FIGURE 10 is a diagrammatical view of the hydraulic actuating system of the hay loader.

Figure 1:
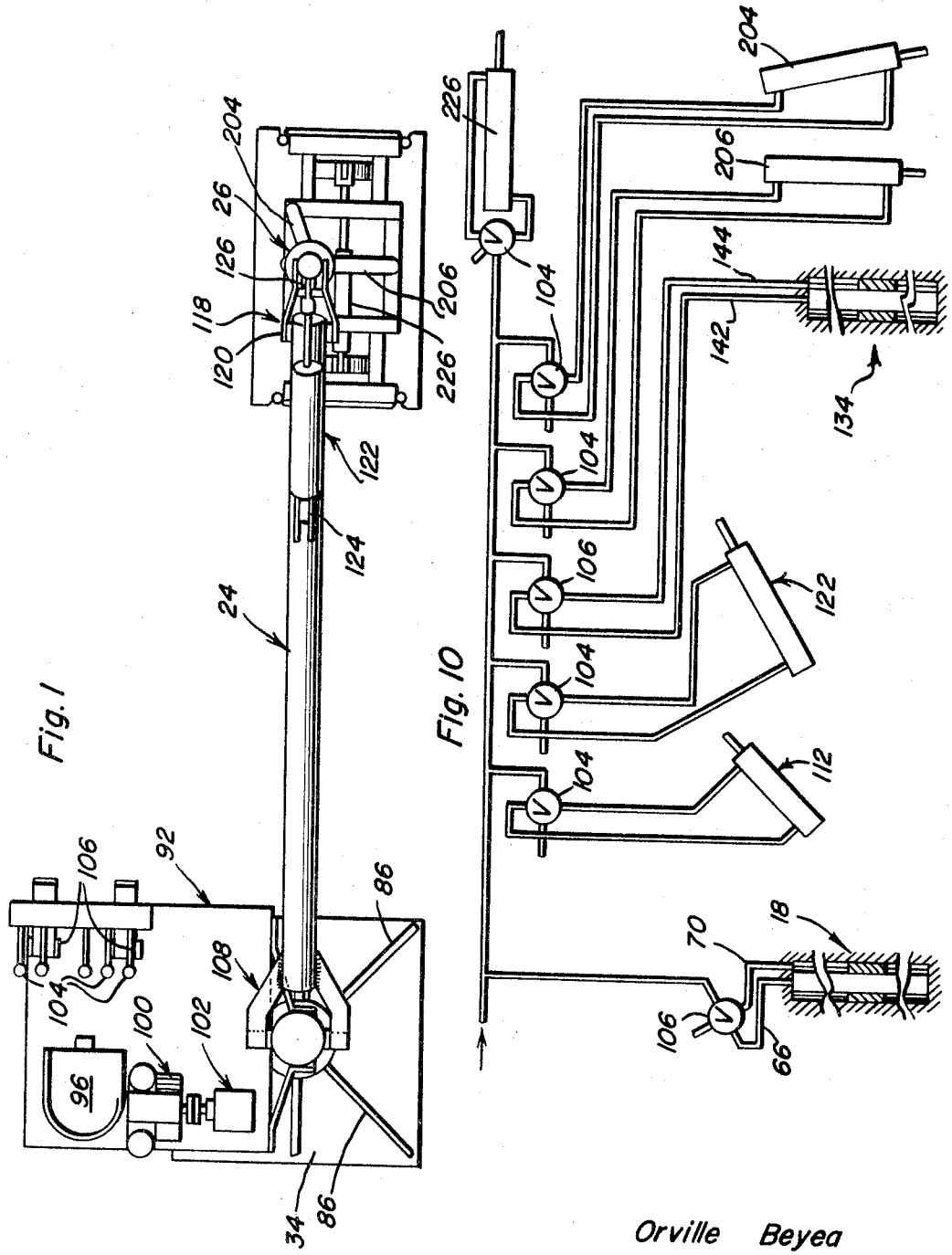
FIGURE 1 is a top plan view of the hay loader of the instant invention.

Referring now more specifically to the drawings the numeral 10 generally designates the load bed of a vehicle 12 provided with ground engaging wheels 14 for ready movement from one location to another.

The loader of the instant invention is generally referred to by the reference numeral 16 and includes an upright or standard assembly generally referred to by the reference numeral 18 which is supported from the load bed 10. The standard 18 includes a lower section generally referred to by the reference numeral 20 and an upper section generally referred to by the reference numeral 22 which is rotatably supported from the lower section 20.

A lifting boom generally referred to by the reference numeral 24 is provided and has one end pivotally secured to the upper section 22 of the upright 18. The free end of the lifting boom 24 has one end of a reach boom generally referred to by the reference numeral 26 pivotally secured thereto and the free end of the reach boom 26 is mounted for rotation relative to the end of the reach boom 26 which is pivotally secured to the lift boom 24. In addition, the free end of the reach boom 26 has a hay grappling assembly generally referred to by reference numeral 28 universally supported therefrom and, as will hereinafter be more fully set forth, the hay bale grappling assembly 28 may be adjustably positioned about a pair of axes disposed at right angles relative to each other and to the longitudinal center line of the reach boom 26.

With attention now invited more specifically to FIGURES 3 and 5 of the drawings it may be seen that the lower section 20 is secured to a mounting plate 30 in any convenient manner such as by welding 32 and that the mounting plate 30 is secured to a base plate 34 in any convenient manner such as by fasteners 36. The base plate 34 is in turn fixedly supported from the load bed 10.

The lower section 20 is internally splined as at 40, see FIGURE 3, and a piston 42 having complementary splines 44 formed thereon is slidably disposed within the lower section 20. The piston 42 has a central bore 46 formed therethrough including spiral splines as at 48 and slidably receives a shaft 50 therethrough which has complementary splines 52 formed thereon. The lower end of the shaft 50 is journalled in a thrust bearing member 54 supported from the mounting plate 30 and a removable cylinder end cap 56 is secured in the upper end of the lower section 20 in any convenient manner and rotatably receives the upper end of the shaft 50 through a central bore 58 formed therein.

The shaft 50 has a central oil passage 60 extending longitudinally therethrough and opening outwardly of the shaft 50 at its lower end by means of a transverse bore 62. The upper end of the oil passage 60 includes a laterally directed end portion 64 which opens generally radially outwardly of the shaft 50 and has the outlet end of an oil conduit 66 secured therein. In addition, the end cap 56 has a threaded bore 68 formed therethrough in which the outlet end of an oil conduit 70 is secured.

The upper end of the upper section 22 has a diametric slot 72 formed therethrough which is aligned with a diametric slot 74 formed through the upper end of the shaft 50 above the oil passage 60. A keying bar 76 is passed through the slots 72 and 74 and are secured in position by means of a pair of removable pins 78. The lower end of the upper section 22 is telescoped over the upper end of the lower section 20, and a support collar 82 is secured to the upper section 22 in any convenient manner and bears against a support or bearing collar 84 rotatably receiving the upper section 22 and fixedly supported from the base plate 34 by means of a plurality of rigid brace members 86.

The upper surface of the support or bearing collar 84 is grooved as at 88 and the support collar 82 includes a grease fitting 90 in communication with the groove 88.

An operator's support platform generally referred to by reference numeral 92 is provided and supported from the upper section 22 by means of angle braces 94 and includes a seat 96 for an operator 98. In addition, an internal combustion engine generally referred to by the reference numeral 100 is supported from the platform 92 and is drivingly coupled to a hydraulic pump 102. Still further, suitable hand actuated control valves 104 and foot actuated control valves 106 are supported from the platform 92 in position to be readily actuated by the operator 98.

The pivoted end of the lift boom 24 includes a bifurcated mount assembly generally referred to by reference numeral 108 which is pivotally supported from the upper section 22 by means of stub shaft 110 projecting outwardly of opposite sides of the upper section 22.

An extensible fluid motor 112 has one end pivotally secured to the upper section 22 as at 114 and the other end pivotally secured to an intermediate portion of the lift arm or boom 24 as at 116.

The reach boom 26 includes a mount assembly generally referred to by reference numeral 118 which is pivotally secured to the free end of the lift boom 24 as at 120 and a second extensible fluid motor generally referred to by the reference numeral 122 has one end pivotally secured to the lift boom 24 as at 124 and the other end pivotally secured to the reach boom 26 as at 126.

The reach boom 26 includes a first end section generally referred to by the reference numeral 128 and comprising a pair of end aligned sections 130 and 132 and a second end section generally referred to by the reference numeral 134. As can best be seen from FIGURE 6 of the drawings the sections 130 and 132 are secured together by means of suitable fasteners 136. The section 132 includes an end wall having threaded outlets 138 and 140 formed therethrough in which the end pair of oil conduits 142 and 144 are secured. The outlets 138 and 140 are aligned with bores 146 and 148 formed in the end cap 150 of the section 130. The lower end of the section 130 has an end plate 152 secured thereacross in any convenient manner and which projects outwardly beyond the section 130 to define a support collar on which a bearing ring 154 is secured by means of suitable fasteners 156. The center of the end cap or wall 152 has a central opening or bore 158 formed with which a sealing ring 160 is cooperable and the lower end of a shaft 162 similar to the shaft 50 is journalled through the opening or bore 158 and includes a downwardly projecting and splined lower end portion 164. The terminal end portion 164 is received in a splined bore 166 formed through the upper end cap 168 of the second end section 134. The end cap 168 includes a laterally directed flange portion 170 to which an annular abutment plate 172 is secured by means of suitable fasteners 174. The lower surface of the inner peripheral portion of the abutment plate 172 is disposed in actual thrust bearing surface in engagement with the upper surface of the bearing ring 154 and an oil groove 176 is provided in the outer periphery of the bearing ring 154 with which a grease fitting 178 is communicated by means of an oil passage 180.

A piston 182 comparable to the piston 42 is splined as at 184 and is slidingly disposed in the section 130 which includes complementary splines 186. Still further, the upper end of the shaft 162 is journalled in a downwardly opening counter bore 188 formed in the end cap 150 and a suitable sealing ring 190 is provided within the counter bore 188 for forming a fluid tight seal between the end cap 150 and the shaft 162. The piston 182 has a bore 192 formed therethrough including a spiral passage 194 and the shaft 162 includes a spiral portion 196 which is receivable in the spiral passage 194.

Accordingly, it may be seen that vertical movement of the pistons 42 and 182 will effect rotation of the upper section 22 and the second end section 134 relative to the sections 20 and 128, respectively.

Figure 2:
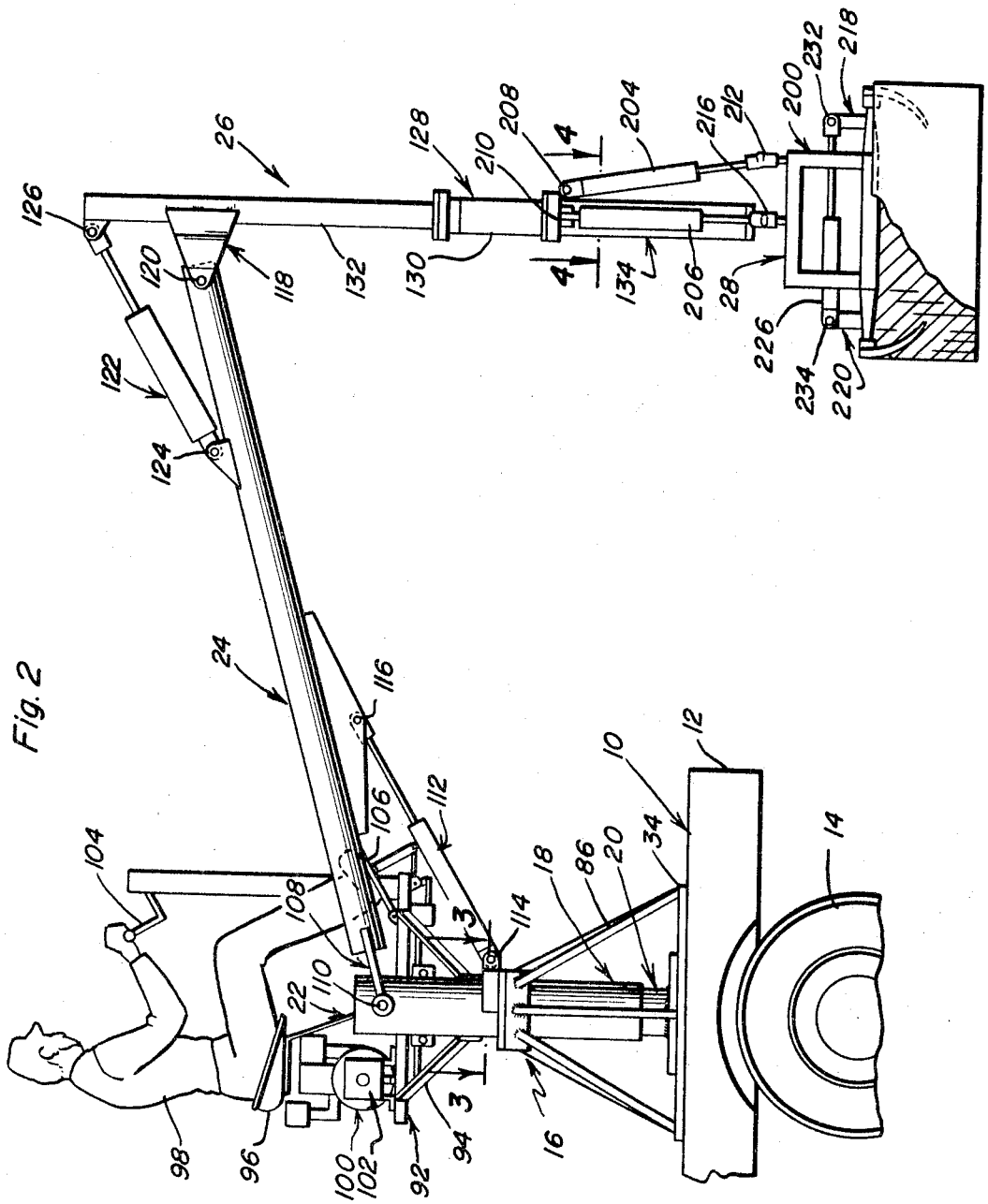
FIGURE 2 is a side elevational view of the hay loader shown supported from the load bed of a vehicle.

With attention now invited more specifically to FIGURES 1, 2 and 7 of the drawings it may be seen that the bale grappling assembly generally referred to by the reference numeral 28 includes a main frame generally referred to by the reference numeral 200. The frame 200 is universally supported from the lower end of the second end section 134 by means of a universal joint 202 and a pair of extensible roll and pitch hydraulic cylinders 204 and 206 have their upper ends pivotally secured to the end section 134 as at 208 and 210 for rotation about axes disposed normal to each other and to the longitudinal center line of the end section 134. The lower ends of the hydraulic cylinders 204 and 206 are universally connected to the frame 200 by means of universal joints 212 and 216, respectively.

A pair of tong arm assemblies generally referred to by the reference numerals 218 and 220 are pivotally secured to opposite ends of the frame 200 by means of pivoting axle assemblies 222 and 224, respectively, and a hydraulic cylinder 226 has its opposite ends pivotally secured to the upstanding lever arms 228 and 230 of the tong arm assemblies 218 and 220, respectively, as at 232 and 234.

Each of the tong arm assemblies comprises a pair of arm members 236 and 238 interconnected at their free ends by means of a support bar 240 to which a pair of tongs 242 and 246 are secured. The free ends of each pair of arms 236 and 238 are also rigidly interconnected by means of the corresponding lever arms 228 and 230 and it may be seen from FIGURE 8 of the drawings that the bars 240 are removably secured to the ends of the arms 236 and 238 by means of suitable fasteners 250. With attention now invited more specifically to FIGURE 9 of the drawings there may be seen a modified form of tong 252 which is supported in pairs from a bar 254 corresponding to the bar 240 and which includes a looped base portion 256 to render the prongs 252 somewhat resilient.

The conduits 66 and 70 and the conduits 142 and 144 are operatively communicated with foot actuated control valves 106 while the hydraulic cylinders 112, 122, 204, 206 and 226 are operatively connected to the hand operated control valves 104. Thus, it may be appreciated that the operator 98 is capable of causing rotation of the upper section 22 and the second end section 134 and also extension and retraction of the hydraulic cylinders 112, 122, 204, 206 and 226.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hay loader adapted to lift and displace cut hay, said loader comprising an upright standard including upper and lower sections rotatable relative to each other, the lower end of said lower section including base means adapted to be supported from a vehicle, first power means operatively connected between said upper and lower sections and operative to effect selective rotation of said upper section relative to said lower section, a lift boom, means pivotally securing one end of said lift boom to said upper section for rotation about a horizontal axis extending transversely of said upper section and said lift boom, second power means operatively connected between said upper section and said lift boom and operative to selectively swing said lift boom relative to said upper section, a reach boom pivotally secured at one end to the free end of said lift boom for rotation about a horizontal axis extending transversely of said lift and reach booms, third power means operatively connected between said lift and reach booms and selectively operable to effect swinging movement of said reach boom relative to said lift boom, a grapple assembly universally supported from the free end of said reach boom and including clam-type grapple arm assemblies including hay bale engaging means on their free ends, means connected between said grapple arm assemblies and operable to open and close the latter, and first and second means operatively connected between said grapple assembly and said reach boom operative to selectively oscillate said grapple assembly relative to said reach boom about axes disposed generally normal to each other and the longitudinal axis of said reach boom.

2. A hay loader adapted to lift and displace cut hay, said loader comprising an upright standard including upper and lower sections rotatable relative to each other, the lower end of said lower section including base means adapted to be supported from a vehicle, first power means operatively connected between said upper and lower sections and operative to effect selective rotation of said upper section relative to said lower section, a lift boom, means pivotally securing one end of said lift boom to said upper section for rotation about a horizontal axis extending transversely of said upper section and said lift boom, second power means operatively connected between said upper section and said lift boom and operative to selectively swing said lift boom relative to said upper section, a reach boom pivotally secured at one end to the free end of said lift boom for rotation about a horizontal axis extending transversely of said lift and reach booms, third power means operatively connected between said lift and reach booms and selectively operable to effect swinging movement of said reach boom relative to said lift boom, a grapple assembly universally supported from the free end of said reach boom and including clam-type grapple arm assemblies including hay bale engaging means on their free ends, means connected between said grapple arm assemblies and operable to open and close the latter, and first and second means operatively connected between said grapple assembly and said reach boom operative to selectively oscillate said grapple assembly relative to said reach boom about axes disposed generally normal to each other and the longitudinal axis of said reach boom, said reach boom including first and second end sections rotatable relative to each other, said first end section of said reach boom being pivotally secured to said lift boom and said first and second means operatively connected between said grapple assembly and said reach boom being connected between said second end section of said reach boom and said grapple assembly.

3. The combination of claim 2 including an operator's platform supported from the upper section of said standard and including control means operative from said platform and operative to effect actuation of said first and second means operatively connected between said grapple assembly and said second end section of said reach boom, said means for swinging said grapple arm assemblies, said means for swinging said reach boom relative to said lift boom, said means for swinging said lift boom relative to said standard, said first power means, and said means for effecting rotation of said second end section of said reach boom relative to the first end section thereof.

4. A hay loader adapted to lift and displace cut hay, said loader comprising an upright standard including upper and lower sections rotatable relative to each other, the lower end of said lower section including base means adapted to be supported from a vehicle, first power means operatively connected between said upper and lower sections and operative to effect selective rotation of said upper section relative to said lower section, a lift boom, means pivotally securing one end of said lift boom to said upper section for rotation about a horizontal axis extending transversely of said upper section and said lift boom, second power means operatively connected between said upper section and said lift boom and operative to selectively swing said lift boom relative to said upper section, a reach boom pivotally secured at one end to the free end of said lift boom for rotation about a horizontal axis extending transversely of said lift and reach booms, third power means operatively connected between said lift and reach booms and selectively operable to effect swinging movement of said reach boom relative to said lift boom, a grapple assembly universally supported from the free end of said reach boom and including clam-type grapple arm assemblies including hay bale engaging means on their free ends, means connected between said grapple arm assemblies and operable to open and close the latter, and first and second means operatively connected between said grapple assembly and said reach boom operative to selectively oscillate said grapple assembly relative to said reach boom about axes disposed generally normal to each other and the longitudinal axis of said reach boom, said lower section being tubular and closed at its lower end, a screw shaft journalled in said lower section and projecting from the upper end thereof, said upper section being telescoped over said lower section and supported therefrom for rotation relative thereto, means keying the upper end portion of said screw shaft projecting above said lower section to said upper section for simultaneous rotation of said upper section and said screw shaft relative to said lower section, a piston threaded on said screw shaft and slidably disposed in said lower section and keyed to the latter against rotation relative thereto, and means for selectively admitting fluid under pressure into said lower section above and below said piston, the upper end of said lower section being sealed relative to said screw shaft, said piston comprising said first power means for effecting rotation of said upper section relative to said lower section.

5. A hay loader adapted to lift and displace cut hay, said loader comprising an upright standard including upper and lower sections rotatable relative to each other, the lower end of said lower section including base means adapted to be supported from a vehicle, first power means operatively connected between said upper and lower sections and operative to effect selective rotation of said upper section relative to said lower section, a lift boom, means pivotally securing one end of said lift boom to said upper section for rotation about a horizontal axis extending transversely of said upper section and said lift boom, second power means operatively connected between said upper section and said lift boom and operative to selectively swing said lift boom relative to said upper section, a reach boom pivotally secured at one end to the free end of said lift boom for rotation about a horizontal axis extending transversely of said lift and reach booms, third power means operatively connected between said lift and reach booms and selectively operable to effect swinging movement of said reach boom relative to said lift boom, a grapple assembly universally supported from the free end of said reach boom and including clam-type grapple arm assemblies including hay bale engaging means on their free ends, means connected between said grapple arm assemblies and operable to open and close the latter, and first and second means operatively connected between said grapple assembly and said reach boom operative to selectively oscillate said grapple assembly relative to said reach boom about axes disposed generally normal to each other and the longitudinal axis of said reach boom, at least the free end portion of the end section of said reach boom pivotally secured to said lift boom being tubular and having a screw shaft rotatably journalled therein, means closing the free end of the end section of said reach boom pivotally secured to said lift boom and rotatably journalling the corresponding end of said screw shaft with the latter projecting through said closing means, the free end section of said reach boom being keyed to said screw shaft for rotation therewith, a piston threadedly engaged with said screw shaft, disposed in said tubular end portion of the end section of said reach boom pivotally secured to said lift boom and keyed to said tubular portion against rotation relative thereto, and means for admitting fluid under pressure into said tubular portion above and below said piston, and means closing the end of said tubular portion remote from the free end of said reach boom and forming a fluid tight seal between the adjacent end of said screw shaft and said tubular end portion, said piston comprising said means operative to effect rotation of the free end section of said reach boom relative to the end section thereof pivotally secured to said lift boom.

6. A hay loader adapted to lift and displace cut hay, said loader comprising an upright standard including upper and lower sections rotatable relative to each other, the lower end of said lower section including base means adapted to be supported from a vehicle, first power means operatively connected between said upper and lower sections and operative to effect selective rotation of said upper section relative to said lower section, a lift boom, means pivotally securing one end of said lift boom to said upper section for rotation about a horizontal axis extending transversely of said upper section and said lift boom, second power means operatively connected between said upper section and said lift boom and operative to selectively swing said lift boom relative to said upper section, a reach boom pivotally secured at one end to the free end of said lift boom for rotation about a horizontal axis extending transversely of said lift and reach booms, third power means operatively connected between said lift and reach booms and selectively operable to effect swinging movement of said reach boom relative to said lift boom, a grapple assembly universally supported from the free end of said reach boom and including clam-type grapple arm assemblies including hay bale engaging means on their free ends, means connected between said grapple arm assemblies and operable to open and close the latter, and first and second means operatively connected between said grapple assembly and said reach boom operative to selectively oscillate said grapple assembly relative to said reach boom about axes disposed generally normal to each other and the longitudinal axis of said reach boom, said first and second means operatively connected between said grapple assembly and the free end section of said reach boom comprising a pair of extensible double acting hydraulic cylinders.

7. A hay loader adapted to lift and displace cut hay, said loader comprising a base, a reach boom, means pivotally supporting one end of said reach boom from said base for rotation about a generally horizontally disposed axis extending transversely of said boom and vertically adjustable relative to said base, means operative to oscillate said reach boom about said axis relative to said base, a grapple assembly universally supported from the free end of said reach boom, first and second means operatively connected between said grapple assembly and said reach boom operative to oscillate said grapple assembly relative to said boom about axes disposed generally normal to each other and the longitudinal axis of said reach boom, said reach boom including first and second end sections rotatable relative to each other, said first end section comprising said one end of said reach boom and said first and second means being operatively connected between said grapple assembly and said reach boom being connected between said second end section of said reach boom and said grapple assembly.

8. The combination of claim 7 wherein said hay loader includes means supporting said horizontally disposed axis for swinging movement about a vertical axis through an arc whose radii are disposed generally normal to said horizontally disposed axis relative to said base.

9. The combination of claim 7 wherein said hay loader includes means supporting said horizontally disposed axis for rotation about a second horizontally disposed axis generally paralleling the first-mentioned axis.

10. The combination of claim 9 wherein said hay loader includes means supporting said second horizontally disposed axis for rotation about a vertical axis.

11. A hay loader adapted to lift and displace cut hay, said loader comprising a support rotatable about an upright axis, a lift boom, means pivotally securing one end of said lift boom to said support for rotation about a horizontal axis extending transversely of said support and said lift boom, power means operatively connected between said support and said lift boom and operative to selectively swing said lift boom relative to said support, a reach boom pivotally secured at one end to the free end of said lift boom for rotation about a horizontal axis extending transversely of said lift and reach booms, additional power means operatively connected between said lift and reach booms and selectively operable to effect swinging movement of said reach boom relative to said lift boom, a grapple assembly universally supported from the free end of said reach boom, first and second means operatively connected between said grapple assembly and said reach boom operative to selectively oscillate said grapple assembly relative to said reach boom about axes disposed generally normal to each other and the longitudinal axis of said reach boom, said reach boom including first and second end sections rotatable relative to each other, said first end section of said reach boom being pivotally secured to said lift boom and said first and second means operatively connected between said grapple assembly and said reach boom being connected between said second end section of said reach boom and said grapple assembly.

12. The combination of claim 7 wherein said grapple assembly includes clam-type grapple arm assembles having hay bale engaging means on their free ends, means connected between said grapple arm assemblies and operable to open and close the latter.

13. The combination of claim 12 wherein the free ends of said grapple arm assemblies include pointed tongs comprising said means adapted to engage a bale of hay.

14. The combination of claim 13 wherein said tongs are arcuate and constructed of rigid but somewhat resilient material.

15. The combination of claim 12 wherein the free ends of said grapple arm assemblies include pointed tongs comprising said means adapted to engage a bale of hay, said tongs including looped base end portions and being constructed of stiff but resilient material.

16. A hay loader adapted to lift and displace cut hay, said loader comprising a base, a reach boom, means pivotally supporting one end of said reach boom from said base for rotation about a generally horizontally disposed axis extending transversely of said boom and vertically adjustable relative to said base, means operative to oscillate said reach boom about said axis relative to said base, load gripping means universally supported from the free end of said reach boom, first and second means operatively connected between said load gripping means and said reach boom operative to oscillate said load gripping means relative to said boom about axes disposed generally normal to each other and the longitudinal axis of said reach boom, said reach boom including first and second end sections rotatable relative to each other, said first end section comprising said one end of said reach boom and said first and second means operatively connected between said load gripping means and said reach boom being connected between said second end section of said reach boom and said load gripping means.

17. A hay loader adapted to lift and displace cut hay, said loader comprising a base, a reach boom, means pivotally supporting one end of said reach boom from said base for rotation about a generally horizontally disposed axis extending transversely of said boom and vertically adjustable relative to said base, means operative to oscillate said reach boom about said axis relative to said base, load gripping means universally supported from the free end of said reach boom, and first and second means operatively connected between said load gripping means and said reach boom operative to oscillate said load gripping means relative to said boom about axes disposed generally normal to each other and the longitudinal axis of said reach boom.

References Cited by the Examiner

UNITED STATES PATENTS

| 2,622,915 | 12/1952 | Horn. | |
|---|---|---|---|
| 3,038,620 | 6/1962 | Collin | 214—147 |
| 3,048,288 | 8/1962 | Dwyer | 214—147 |

FOREIGN PATENTS

| 531,122 | 7/1955 | Italy. |
|---|---|---|
| 153,251 | 1/1956 | Sweden. |

HUGO O. SCHULZ, *Primary Examiner.*